(12) United States Patent
Gomez et al.

(10) Patent No.: US 10,184,339 B2
(45) Date of Patent: Jan. 22, 2019

(54) TURBOMACHINE

(71) Applicant: MTU Aero Engines GmbH, Munich (DE)

(72) Inventors: Sergio Elorza Gomez, Munich (DE); Tim Schneider, Dachau (DE)

(73) Assignee: MTU Aero Engines GmbH, Munich (DE)

( * ) Notice: Subject to any disclaimer, the term of this patent is extended or adjusted under 35 U.S.C. 154(b) by 1533 days.

(21) Appl. No.: 13/760,604

(22) Filed: Feb. 6, 2013

(65) Prior Publication Data

US 2013/0209224 A1    Aug. 15, 2013

(30) Foreign Application Priority Data

Feb. 10, 2012    (EP) .................................... 12154929

(51) Int. Cl.
| | | |
|---|---|---|
| *F01D 1/04* | (2006.01) | |
| *F01D 5/14* | (2006.01) | |
| *F01D 9/04* | (2006.01) | |
| *F04D 29/56* | (2006.01) | |
| *F04D 29/54* | (2006.01) | |

(52) U.S. Cl.
CPC ............ *F01D 1/04* (2013.01); *F01D 5/146* (2013.01); *F01D 9/041* (2013.01); *F04D 29/544* (2013.01); *F04D 29/563* (2013.01); *F05D 2240/301* (2013.01); *Y02T 50/673* (2013.01)

(58) Field of Classification Search
CPC .......... F01D 5/141; F01D 5/142; F01D 5/143; F01D 5/145; F01D 1/04; F04D 29/544

USPC ...................... 416/198 A, 223 R, 228, 231 R
See application file for complete search history.

(56) References Cited

U.S. PATENT DOCUMENTS

| | | | | |
|---|---|---|---|---|
| 1,889,717 A | * | 11/1932 | Warfel .................... | B64C 11/48 |
| | | | | 416/200 R |
| 2,314,572 A | * | 3/1943 | Chitz ...................... | F01D 5/142 |
| | | | | 244/198 |
| 2,938,662 A | * | 5/1960 | Eckert .................... | F04D 29/324 |
| | | | | 415/914 |
| 2,982,361 A | | 3/1961 | Rosen | |
| 3,075,743 A | * | 1/1963 | Sheets ..................... | F01D 5/142 |
| | | | | 415/199.4 |
| 3,606,579 A | * | 9/1971 | Mehus ..................... | B63H 1/18 |
| | | | | 416/200 R |
| 3,692,425 A | | 9/1972 | Erwin | |
| 3,767,324 A | * | 10/1973 | Ericson ................... | B05B 3/022 |
| | | | | 416/201 R |

(Continued)

FOREIGN PATENT DOCUMENTS

| | | |
|---|---|---|
| DE | 3237669 | 4/1984 |
| EP | 0823540 | 2/1998 |

(Continued)

*Primary Examiner* — Dwayne J White
(74) *Attorney, Agent, or Firm* — Davidson, Davidson & Kappel, LLC

(57) ABSTRACT

A turbomachine including at least one blade-row group that is arranged in the main flow path and at least two rows of blades that are adjacent to each other in the main flow direction, each row having a plurality of blades (38, 40), whereby a narrow cross section and a degree of overlap between the blades of the upstream row of blades and the blades of the downstream row of blades vary starting at the center of the main flow path in the direction of at least one main flow limiter.

10 Claims, 10 Drawing Sheets

(56) References Cited

U.S. PATENT DOCUMENTS

| | | | | |
|---|---|---|---|---|
| 3,830,587 | A | * | 8/1974 | Shipes .................. F04D 19/007 138/39 |
| 3,867,062 | A | | 2/1975 | Troller |
| 3,883,264 | A | | 5/1975 | Gadicherlav |
| 3,937,592 | A | * | 2/1976 | Bammert ................ F01D 5/142 415/194 |
| 4,512,718 | A | * | 4/1985 | Stargardter ............ F01D 5/142 415/181 |
| 4,913,670 | A | * | 4/1990 | Spranger .................. B63B 3/38 416/231 B |
| 5,002,001 | A | * | 3/1991 | Spranger .................. B63B 3/38 114/140 |
| 5,236,307 | A | * | 8/1993 | Ng ......................... F01D 5/146 415/148 |
| 6,099,249 | A | * | 8/2000 | Hashimoto ............. F01D 5/142 415/181 |
| 7,462,014 | B2 | * | 12/2008 | Chang .................. F04D 29/681 415/193 |
| 7,753,652 | B2 | * | 7/2010 | Truckenmueller ...... F01D 5/141 416/189 |
| 8,534,997 | B2 | * | 9/2013 | Guemmer ..................... 415/181 |
| 2008/0298974 | A1 | * | 12/2008 | Guemmer ............. F04D 29/324 416/223 R |
| 2010/0303629 | A1 | | 12/2010 | Guemmer |
| 2012/0148396 | A1 | | 6/2012 | Guemmer |

FOREIGN PATENT DOCUMENTS

| | | | |
|---|---|---|---|
| EP | 2261463 A2 | 12/2010 | |
| EP | 2463480 | 6/2012 | |
| GB | 752674 | 7/1956 | |
| WO | WO 2005040559 A1 * | 5/2005 | ............ F01D 5/146 |

\* cited by examiner

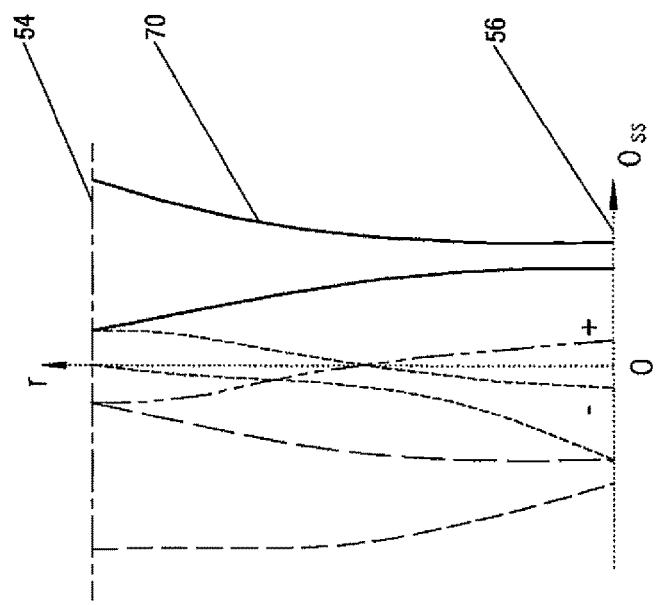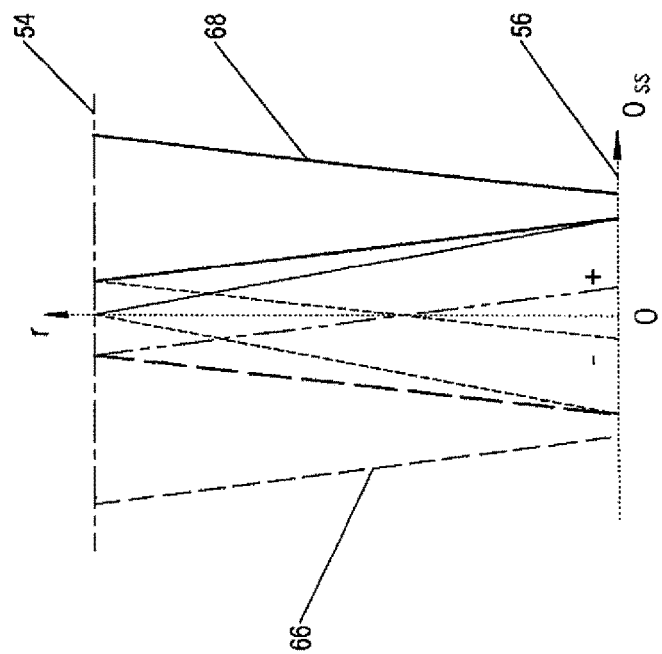
Fig. 9

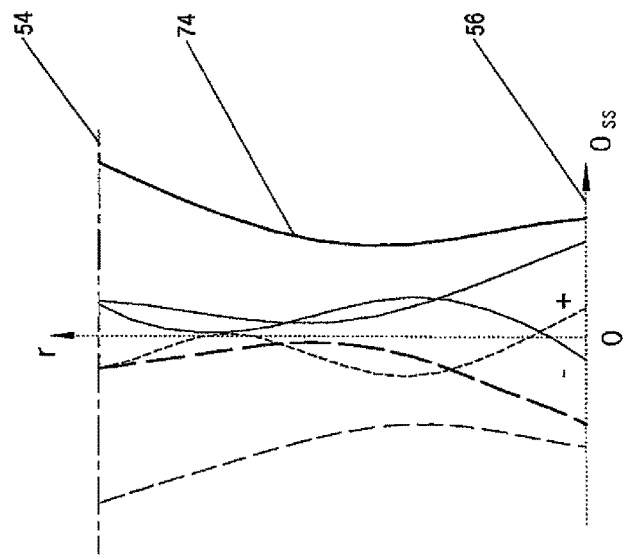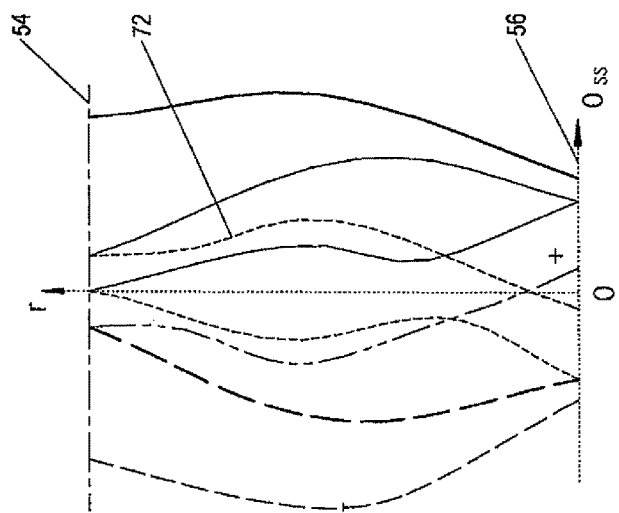
Fig. 10

TURBOMACHINE

This claims the benefit of European Patent Application EP 121 549 29.9, filed Feb. 10, 2012 and hereby incorporated by reference herein.

The invention relates to a turbomachine.

BACKGROUND

The maximum deflection of a row of blades of a turbomachine and thus its aerodynamic load capacity are limited, for one thing, by a separation of the flow along the blade profile. For another thing, the maximum deflection is limited by a separation of a boundary-layer flow on the side walls on the hub side and on the housing side. Double-row blade arrangements are known for purposes of increasing the deflection capacity of rows of blades. A prior-art turbomachine having such an arrangement is shown in FIG. 1. This turbomachine has a hub 2 that is mounted in a housing 4 so as to rotate around a rotor axis 6 that extends in the lengthwise direction x. The hub 2 and the housing 4 delimit an annular main flow path 8 which is traversed from left to right as depicted by the horizontal arrow and in which, for example, a blade-row group 10 on the rotor side, a blade-row group 12 on the stator side and a variable blade-row group 14 are arranged. The blade-row groups 10, 12, 14 each have two rows of blades arranged one after the other in the flow direction, each having a plurality of blades 16, 18. For the sake of clarity, primarily the blade-row group 10 on the rotor side has been provided with reference numerals below. The blade-row group 10 on the rotor side and the blade-row group 12 on the stator side are each firmly joined to the hub 2 and to the housing 4, respectively, whereby a clearance 20 is formed between the tips of the blades 16, 18 and the housing 4 or the hub 2. The blades 16, 18 of the variable blade-row group 14 are each mounted at their ends on a rotary disk 22, 24 and can be pivoted around a transversal axis 26 as depicted by the arrow indicating the rotation. The front blades 16 each have a trailing edge 28 facing the rear blades 18. The rear blades 18 each have a leading edge 30 facing the front blades 16. The edges 28, 30 are configured rectilinearly and they extend radially almost perpendicular to the main flow direction, so that a constant axial edge distance $D_{const}$ is formed between the edges 28, 30 and thus between the blades 16, 18. Furthermore, a constant edge distance is formed in the circumferential direction between the edges 28, 30. Moreover, the blades 16, 18 have a constant narrow cross section, a constant degree of overlap on the pressure side, and a constant degree of overlap on the suction side. Moreover, FIG. 1 shows a blade 32 of an individual row of rotor blades.

However, it has been found that, in the side wall area, that is to say, in the area of the hub 2 and/or of the housing 4, the influence of the boundary layer calls for blade contouring that diverges from the center 34 of the main flow path, and by means of this contouring, the flow conditions in the side-wall area that differ from those of the center 34 of the main flow path can be taken into account. Therefore, when it comes to blade-row groups, European patent application EP 2 261 463 A2 proposes to set a meridional distance between the trailing edges of the front blades and the leading edges of the rear blades in such a way that this distance increases from the center of the main flow path in the direction of a side wall on the hub side or housing side.

SUMMARY OF THE INVENTION

It is an object of the present invention to provide a turbomachine with optimized flow characteristics.

The present invention provides a turbomachine comprising at least one blade-row group that is arranged in the main flow path and at least two rows of blades that are adjacent to each other in the main flow direction, each row having a plurality of blades. According to the invention, the turbomachine has a narrow cross section and a degree of overlap between the blades of the upstream row of blades and the blades of the downstream row of blades which vary starting at the center of the main flow path in the direction of at least one main flow limiting means.

Owing to the narrow cross section and to the degree of overlap which vary starting at the center of the main flow path in the direction of at least one main flow limiting means, the positioning of the blades relative to each other and their interaction are adapted to the main flow in the side wall area, thus promoting a separation-free flow through the rows of blades. Due to the inventive radial change of the blade arrangement, namely, of the narrow cross section formed by two blades as well as its degree of overlap on the suction side and/or on the pressure side, changed boundary conditions of the flow in the side wall area are taken into account and separations of the flow in the side wall area are reduced. The inventive configurations of the narrow cross sections and of the degrees of overlap can be employed for any type of blades. Examples are rotors with a clearance band or a shroud band, stators with a clearance, half clearance or without a clearance as well as variable stators.

In one embodiment, the narrow cross section increases steadily in the direction of the main flow limiting means.

In this context, the narrow cross section can increase in the direction of the main flow limiting means and can then decrease.

As an alternative, the narrow cross section can increase in the direction of the main flow limiting means and can then remain constant.

In another embodiment, the narrow cross section decreases steadily in the direction of the main flow limiting means.

In this context, the narrow cross section can decrease in the direction of the main flow limiting means and can then increase.

As an alternative, the narrow cross section can decrease in the direction of the main flow limiting means and can then remain constant.

In one embodiment, the degree of overlap increases steadily in the direction of the main flow limiting means.

In this context, the degree of overlap can increase in the direction of the main flow limiting means and can then decrease.

As an alternative, the degree of overlap can increase in the direction of the main flow limiting means and can then remain constant.

In another embodiment, the degree of overlap decreases steadily in the direction of the main flow limiting means.

In this context, the degree of overlap can decrease in the direction of the main flow limiting means and can then increase.

As an alternative, the degree of overlap can decrease in the direction of the main flow limiting means and can then remain constant.

The narrow cross section and the degree of overlap can vary starting at the center of the main flow path in the direction of both main flow limiting means.

In this context, the narrow cross section and the degree of overlap can have identical or varying configurations in the direction of the main flow limiting means.

Other advantageous embodiments of the invention are the subject matter of additional subordinate claims.

BRIEF DESCRIPTION OF THE DRAWINGS

Preferred embodiments of the invention will be explained in greater detail below on the basis of schematic depiction. The following is shown.

DETAILED DESCRIPTION

Figure 1:
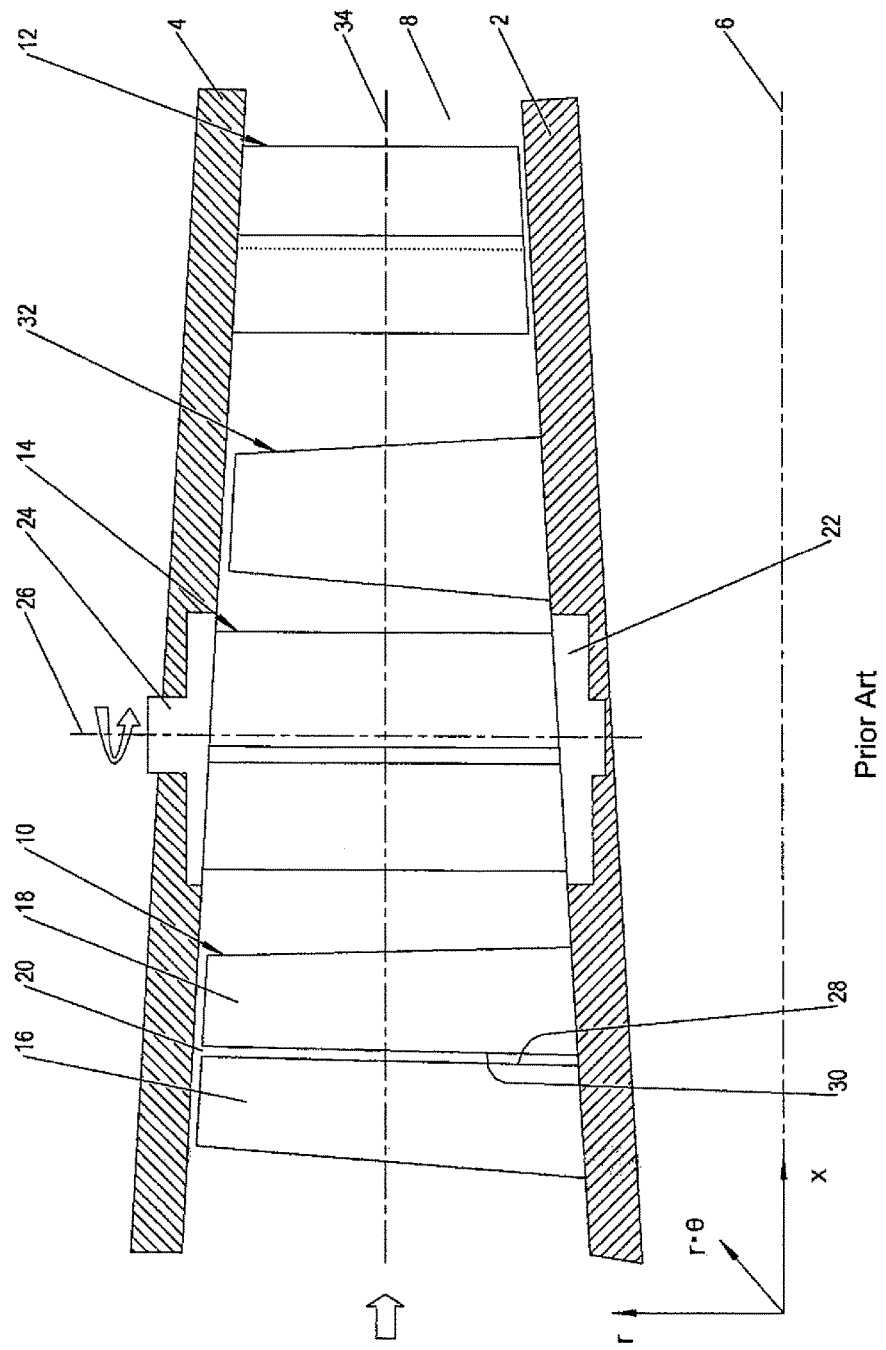
FIG. 1 a longitudinal section through a main flow path of a prior-art turbomachine, FIG. 2 a top view of an axial plane of an embodiment of a blade-row group according to the invention, in a nozzle arrangement with positive degrees of overlap, FIG. 3 a detailed view of FIG. 2, FIG. 4 a top view of an axial plane of an embodiment of a blade-row group according to the invention, in a diffuser arrangement with positive degrees of overlap, FIG. 5 a detailed view of FIG. 4, FIG. 6 a top view of an axial plane of a blade-row group, with negative degrees of overlap, FIG. 7 a detailed view of FIG. 6, FIG. 8 configurations of the narrow cross sections according to the invention, by way of example, FIG. 9 configurations of the degrees of overlap according to the invention, by way of example, and FIG. 10 additional configurations of the degrees of overlap according to the invention, by way of example.

Below, identical structural elements preferably have the same reference numerals whereby, for the sake of clarity, only a few of the elements are provided with reference numerals.

Figure 2:
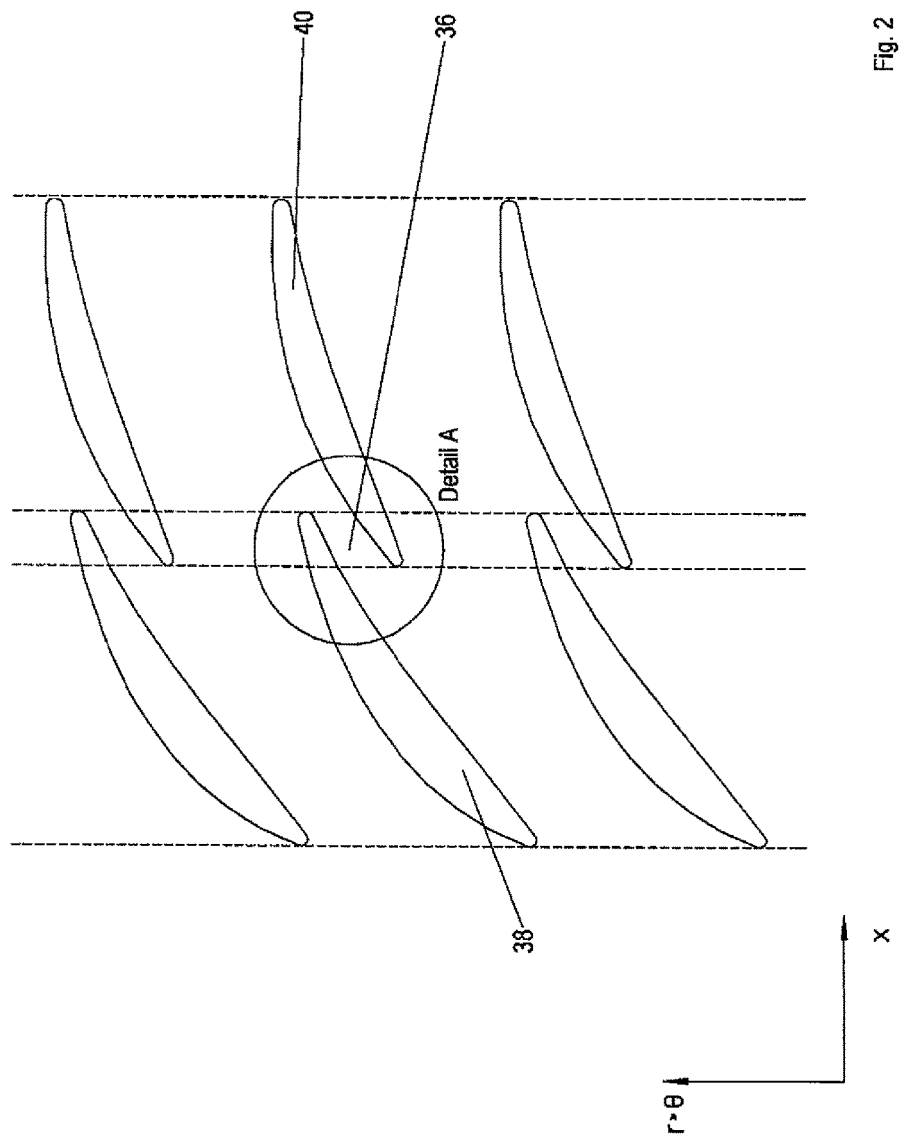

FIG. 2 shows a top view of a circumferential section of a blade-row group of a turbomachine, for instance, a stationary gas turbine or an aircraft engine. The blade-row group has at least two row of blades that are adjacent to each other in the main flow direction, each row having a plurality of blades 38 and 40. The rear blades 40 are arranged on the pressure side of the front blades 38, whereby a flow channel 36 narrows like a nozzle between the blades 38, 40. The term "on the pressure side" means close to the pressure side of a front blade 38 and far from a suction side of an adjacent front blade 38.

Figure 3:
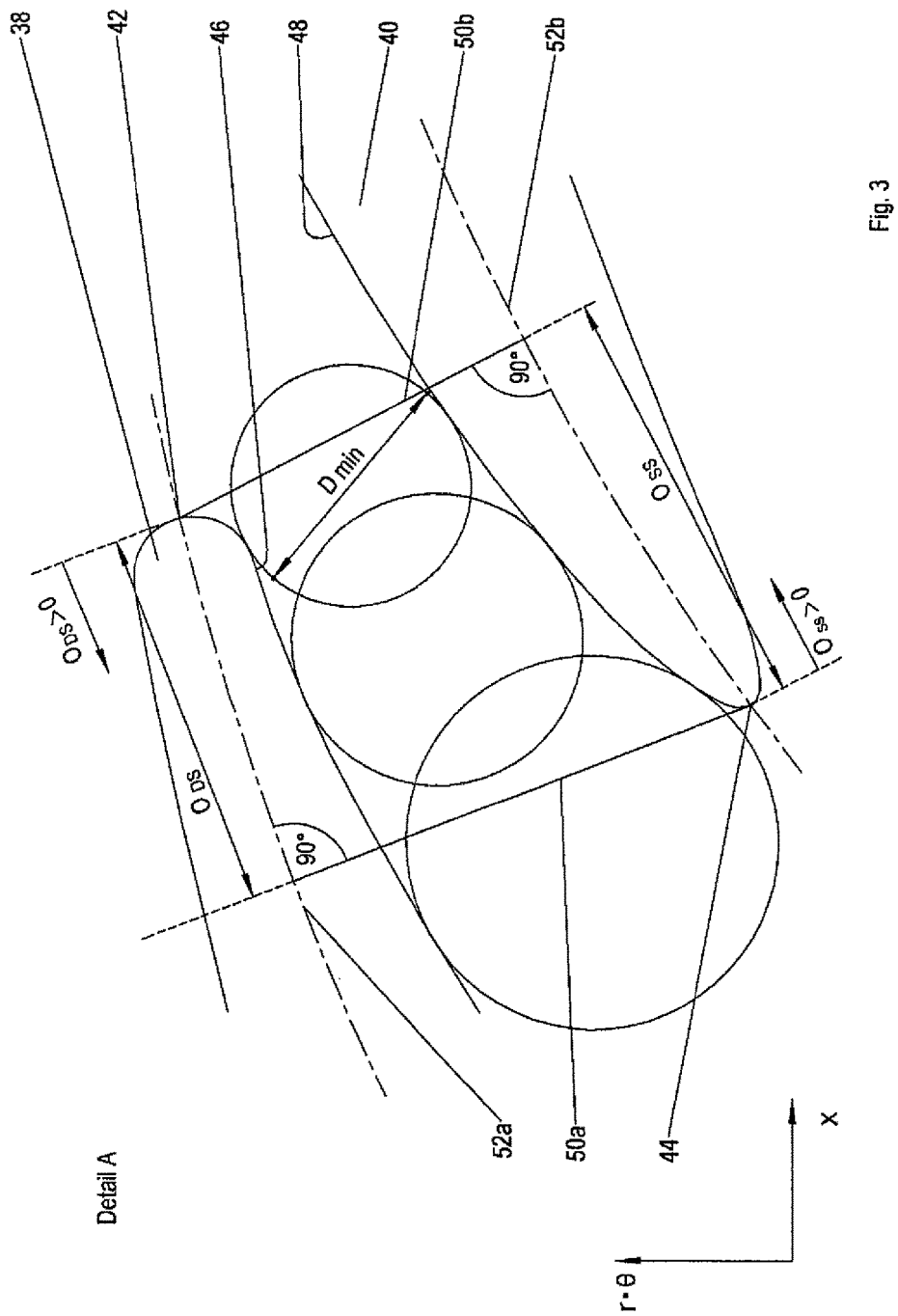

As is shown in the detailed view A in FIG. 3, in the area of a trailing edge 42 of one of the upstream or front blades 38 and in the area of a leading edge 44 of one of the downstream or rear blades 40, the blade-row group has a narrow or narrowest cross section $D_{min}$, a degree of overlap $O_{DS}$ on the pressure side and a degree of overlap $O_{SS}$ on the suction side.

In this embodiment, the narrow or narrowest cross section $D_{min}$ is determined by ascertaining the smallest distance (circle having the smallest radius) between a pressure side 46 of the front blades 38 and a suction side 48 of the rear blades 40. Since the blades 38, 40 are positioned like nozzles with respect to each other, the narrow cross section $D_{min}$ is close to the trailing edges 42 of the front blades 38 and far from the leading edges 44 of the rear blades 40.

Owing to the inventive radially variable positioning of the front and rear rows of blades, it is possible for the narrow cross section $D_{min}$ to be in a plane between the pressure side 46 of the front row of blades and the suction side 48 of the rear row of blades, but to then increase in the direction of another plane to such an extent that the rear row of blades is actually closer to the suction side 48 of the front row of blades. The examples of configurations shown in the figures below always refer to a specific side of the blade.

The degrees of overlap $O_{DS}$ and $O_{SS}$ are determined separately for the pressure side 46 and for the suction side 48. Each row of blades has a degree of overlap $O_{DS}$ and $O_{SS}$ on the pressure side and on the suction side, respectively, whereby preference is given to the degree of overlap $O_{DS}$, $O_{SS}$ that is formed with the blade surface 46, 48 that is closer.

The degree of overlap $O_{DS}$ on the pressure side is ascertained by lowering a plumb line 50a from the leading edge 44 of the rear blade 40 onto a skeleton line 52a of the front blade 38.

The distance between the trailing edge 42 of the front blade 38 and the point of intersection between the plumb line 50a and the skeleton line 52a is the degree of overlap $O_{DS}$.

The degree of overlap $O_{SS}$ on the suction side is ascertained by lowering a plumb line 50b from the trailing edge 42 of the front blade 38 onto a skeleton line 52b of the rear blade 40. The distance between the leading edge 44 and the point of intersection between the plumb line 50b and the skeleton line 52b of the rear blade 40 is the degree of overlap $O_{SS}$.

Fundamentally, the degrees of overlap $O_{DS}$, $O_{SS}$ are ascertained to be positive from a given edge 42, 44 in the direction of the corresponding blade 40, 38. In the embodiment shown, the degrees of overlap $O_{DS}$, $O_{SS}$ consequently have positive values ($O_{DS}>0$, $O_{SS}>0$), whereby the degree of overlap $O_{DS}$ on the pressure side acquires smaller positive values than the degree of overlap $O_{SS}$ on the suction side ($O_{DS}<O_{SS}$). As has been sketched in FIGS. 6 and 7, negative degrees of overlap $O_{DS}$, $O_{SS}$ can also be formed.

Figure 4:
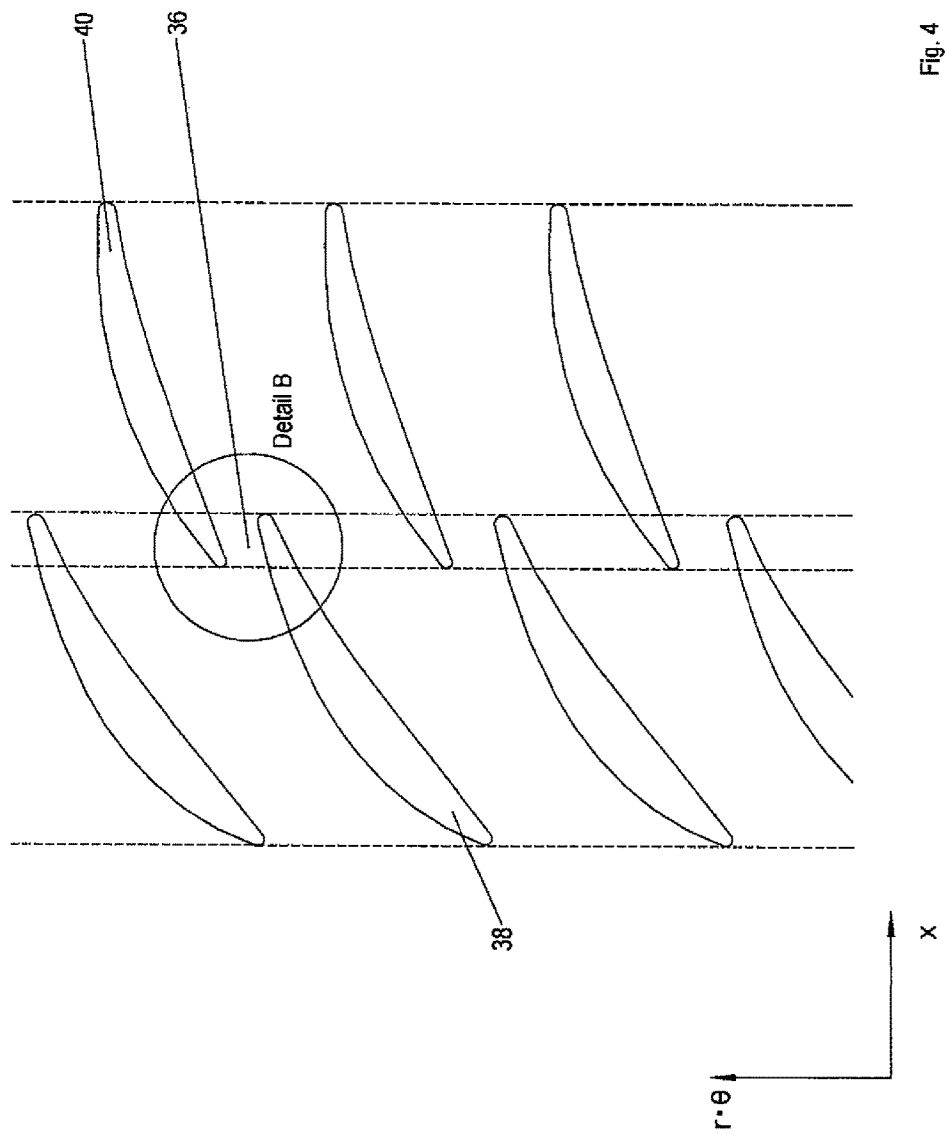
Figure 5:
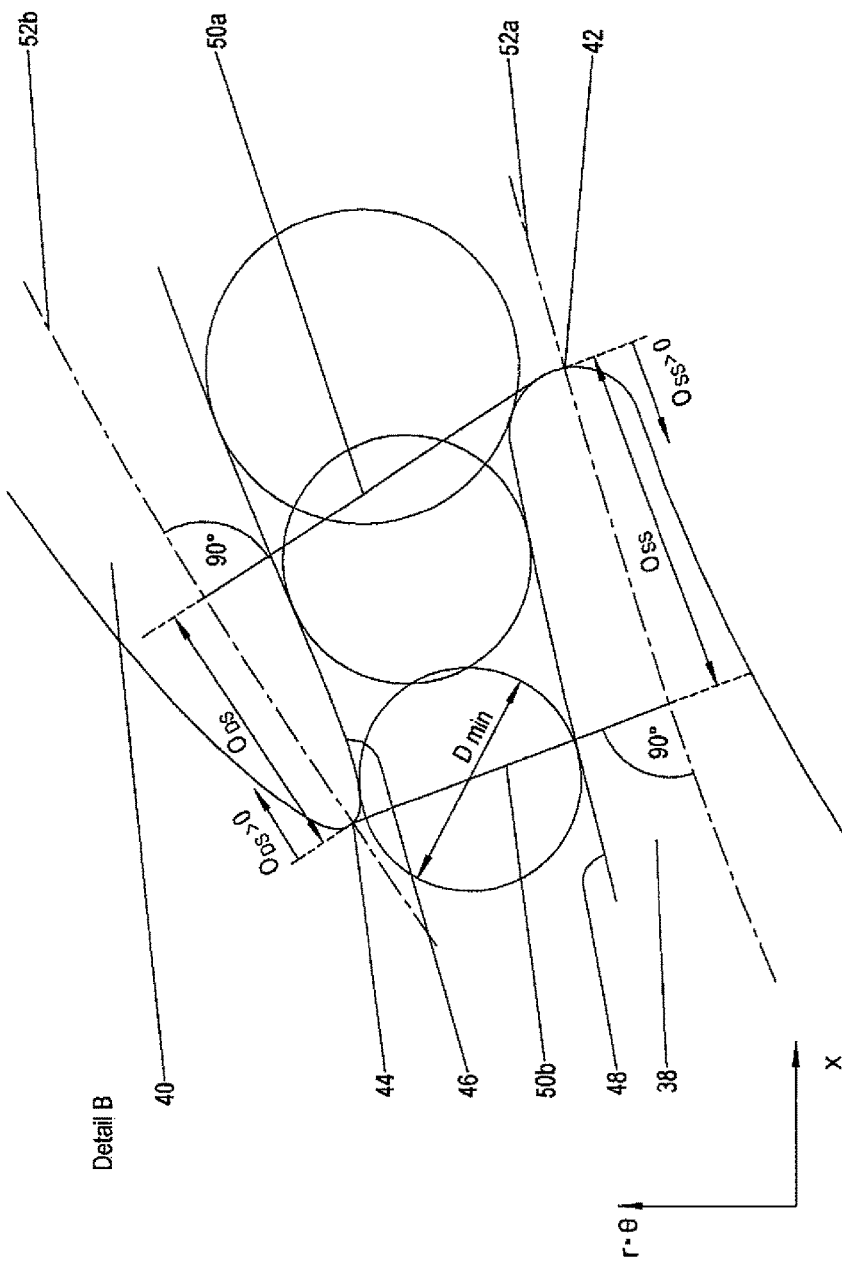

In FIGS. 4 and 5, the narrow cross section $D_{min}$ and the degrees of overlap $O_{DS}$, $O_{SS}$ are shown in a diffuser arrangement of a front row of blades with respect to a rear row of blades. For this purpose, the rear blades 40 are arranged on the suction side of the front blades 38, so that a flow channel 36 widens like a diffuser between the blades 38, 40. The term "on the suction side" means close to the suction side of a front blade 38 and far from a pressure side of an adjacent front blade 38.

In this embodiment, the narrow cross section $D_{min}$ is determined each time between the suction side 48 of the front row of blades and the pressure side 46 of the rear row of blades. Since the blades 38, 40 are positioned like diffusers with respect to each other, the narrow cross section $D_{min}$ is located close to the leading edges 44 of the rear blades 40 and thus far from the trailing edges 42 of the front blades 38.

The degrees of overlap $O_{DS}$, $O_{SS}$ have positive values ($O_{DS}>0$, $O_{SS}>0$) whereby, corresponding to the previous embodiment according to FIGS. 2 and 3, the degree of overlap $O_{DS}$ on the pressure side is smaller than the degree of overlap $O_{SS}$ ($O_{DS}<O_{SS}$) on the suction side.

The degree of overlap $O_{DS}$ on the pressure side is ascertained by lowering a plumb line 50a from the trailing edge 42 of the front blade 38 onto a skeleton line 52b of the rear blade 40. The distance between the leading edge 44 and the point of intersection between the plumb line 50b and the skeleton line 52b of the rear blade 40 is the degree of overlap $O_{SS}$.

The degree of overlap $O_{SS}$ on the suction side is ascertained by lowering a plumb line 50b from the leading edge 44 of the rear blade 40 onto a skeleton line 52a of the front blade 38. The distance between the trailing edge 42 of the front blade 38 and the point of intersection between the plumb line 50b and the skeleton line 52a is the degree of overlap $O_{SS}$.

Figure 6:
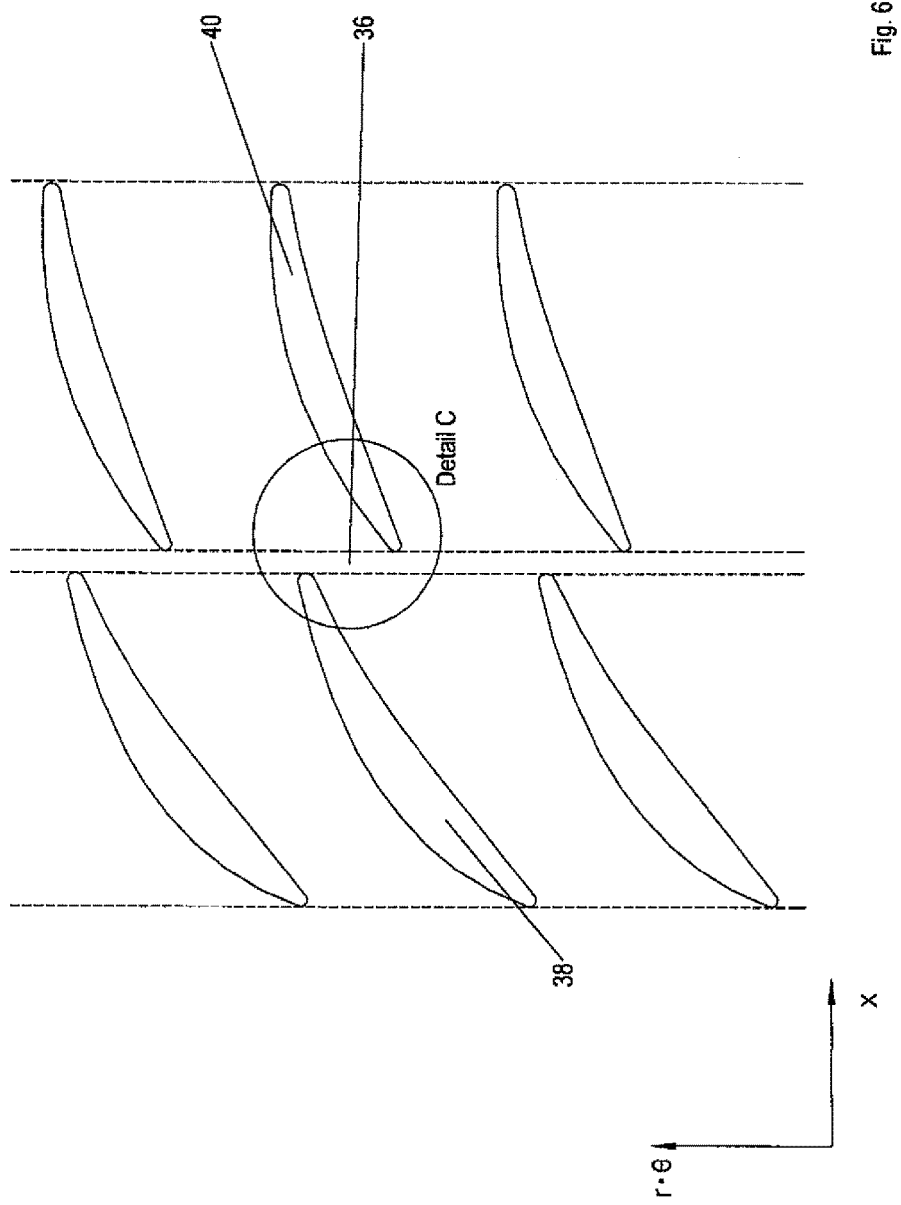
Figure 7:
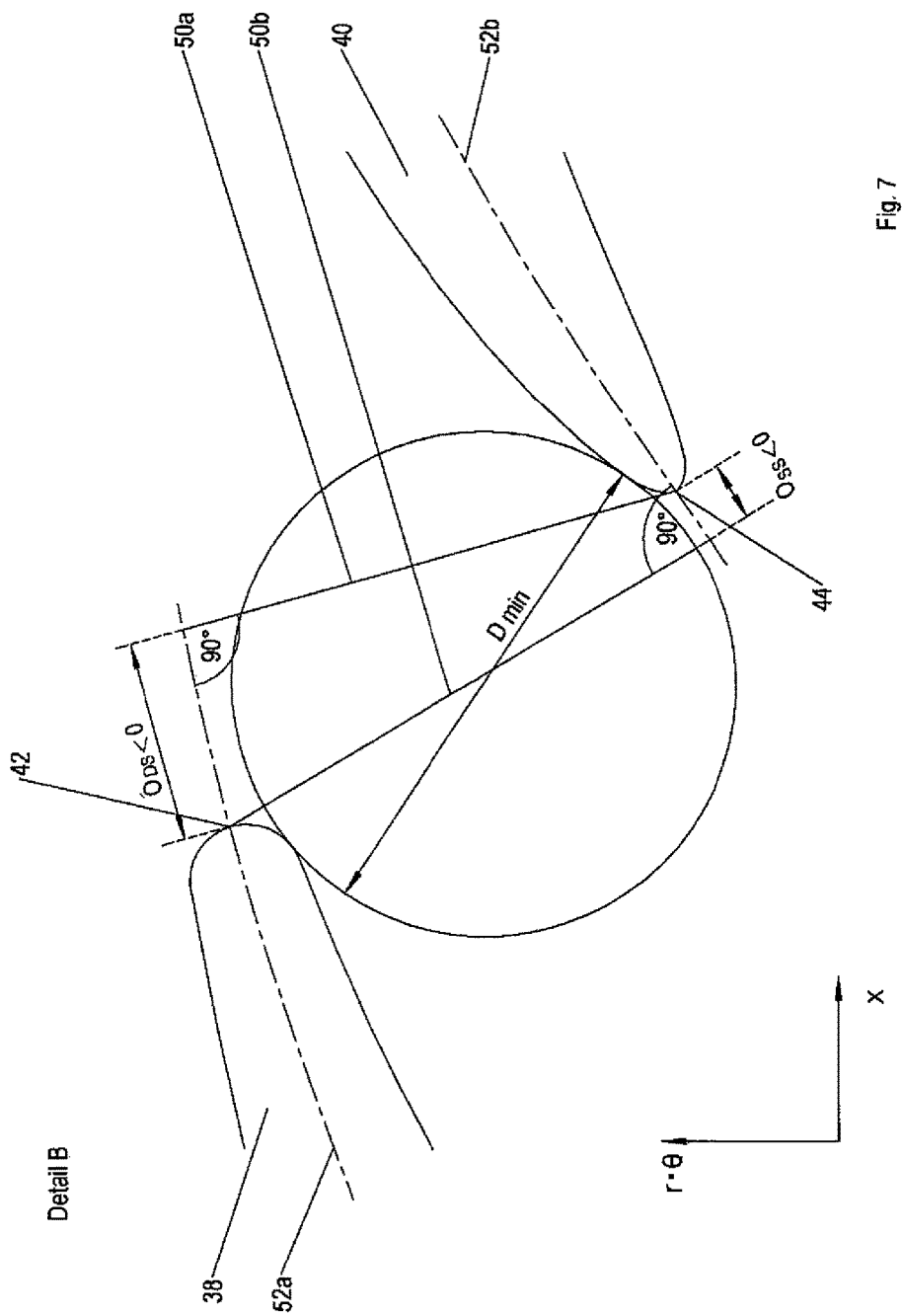

FIGS. 6 and 7 show a blade-row group whose front blades 38 and rear blades 40 display negative degrees of overlap $O_{DS}$, $O_{SS}$ ($O_{DS}$<0, $O_{SS}$<0). In this context, the degree of overlap $O_{DS}$ on the pressure side acquires greater negative values than the degree of overlap $O_{SS}$ ($O_{DS}$<$O_{SS}$) on the suction side. The rear blades 40 are arranged on the pressure side of the front blades 38. For purposes of depicting the negative degrees of overlap $O_{DS}$, $O_{SS}$, the skeleton lines 52a, 52b of the blades 38, 40 are extrapolated linearly. Preferably, with a negative overlap, the narrow cross section $D_{min}$, up to about 10% of an appertaining chord length of the blade is determined. Due to the negative degrees of overlap $O_{DS}$, $O_{SS}$, in contrast to the previous embodiments, the narrow cross section $D_{min}$ is close to the trailing edges 42 of the front blades 38 and close to the leading edges 44 of the rear blades 40.

The degree of overlap $O_{DS}$ on the pressure side is ascertained by lowering a plumb line 50a from the leading edge 44 of the rear blade 40 onto the extrapolated skeleton line 52a of the front blade 38. The distance between the trailing edge 42 of the front blade 38 and the point of intersection between the plumb line 50a and the extrapolated skeleton line 52a is the degree of overlap $O_{DS}$.

The degree of overlap $O_{SS}$ on the suction side is ascertained by lowering a plumb line 50b from the trailing edge 42 of the front blade 38 onto the extrapolated skeleton line 52b of the rear blade 40. The distance between the leading edge 44 and the point of intersection between the plumb line 50b and the extrapolated skeleton line 52b of the rear blade 40 is the degree of overlap $O_{SS}$.

Figure 8:
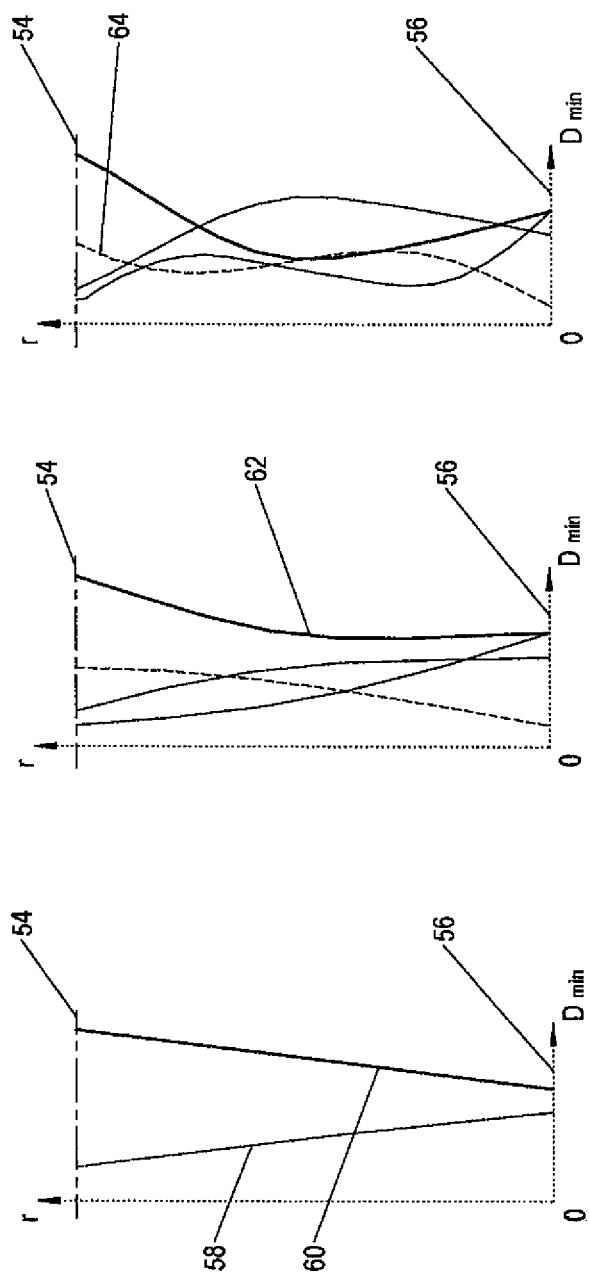

As can be seen in FIG. 8, according to the invention, the narrow cross section $D_{min}$ can vary starting at the center 54 of the main flow path or at the center line of intersection in the direction of a main flow limiting means or main flow limiter 56. The at least one main flow limiting means constitutes an area of the turbomachine on the hub side or housing side, and it is, for example, directly a hub section or housing section or a blade shroud band. A number of configurations of the narrow cross section $D_{min}$ are explained by way of example. The other narrow cross section configurations $D_{min}$ shown in FIG. 8 constitute additional embodiments, even if they are not expressly explained in the description.

The narrow cross section $D_{min}$, as shown in the left-hand depiction, can be linear and, for instance, can increase steadily (straight line 58). By the same token, it can be linear and decrease steadily (straight line 60).

As is shown in the depiction in the middle, the narrow cross section $D_{min}$ can likewise acquire curved configurations and, for example, can decrease from the center 54 of the main flow path in the direction of the main flow limiting means 56 over an area of the radial height, and can then remain constant over a height area (curve 62).

As is shown in the right-hand depiction, the narrow cross section $D_{min}$ can also increase or decrease only over a height area in the direction of the main flow limiting means 56, and can then once again increase or decrease over a height area, and/or can be constant over a remaining height area. For instance, reference is hereby made to the S-shaped line 64 which decreases starting at the center 54 of the main flow path in the direction of the main flow limiting means 56 over a height area, after which it increases over a height area, and it finally decreases again over a height area.

The narrow cross section $D_{min}$ can vary starting at the center 54 of the main flow path in the direction of the main flow limiting means 56, whereby it can have different configurations in the direction of the main flow limiting means on the hub side and in the direction of the main flow limiting means on the housing side.

As can be seen in FIGS. 9 and 10 on the basis of the configurations of the degree of overlap $O_{SS}$ on the suction side given by way of an example, the degrees of overlap $O_{SS}$, $O_{DS}$ can vary, according to the invention, starting at the center 54 of the main flow path in the direction of at least one of the main flow limiting means 56. The degrees of overlap $O_{DS}$ on the pressure side exhibit essentially analogous configurations. A number of configurations of the degree of overlap $O_{SS}$ on the suction side are explained below by way of an example. The other degrees of overlap $O_{SS}$ on the suction side shown in FIG. 8 constitute additional embodiments relating to the degrees of overlap $O_{DS}$ on the pressure side, even if they are not expressly explained in the description.

As is shown in the left-hand depiction according to FIG. 9, the degree of overlap $O_{SS}$ can be linear and, for example, can increase steadily (straight line 66) or decrease steadily (straight line 68). In this context, the term "increase" also refers to a transition from negative to positive values. By the same token, the term "decrease" also refers to a transition from positive to negative values as well as to a quantitative increase in the negative values.

As is shown in the right-hand depiction in FIG. 9, the degree of overlap $O_{SS}$ can also have curved configurations. As can be seen, for instance, on the basis of the curve 70, the degree of overlap $O_{SS}$ can decrease starting at the center 54 of the main flow path in the direction of the main flow limiting means 56 over a height area, and can then remain constant over a height area.

As is shown in the depictions according to FIG. 10, the degree of overlap $O_{SS}$ can increase or decrease only over a height area in the direction of the main flow limiting means 56, and can then once again increase or decrease over a height area and/or can be constant over a remaining height area. For instance, reference is hereby made to the S-shaped line 72 in the left-hand depiction, which, starting at the center 54 of the main flow path in the direction of the main flow limiting means 56, displays a decreasing degree of overlap $O_{SS}$, then an increasing degree of overlap $O_{SS}$ and then once again a decreasing degree of overlap $O_{SS}$. For the sake of completeness, reference is hereby made to the degree of overlap $O_{SS}$ indicated by the sketched arc 74 in the right-hand depiction, which decreases starting at the center 54 of the main flow path in the direction of the main flow limiting means 56, and then increases over a height area.

The degree of overlap $O_{SS}$ or the degrees of overlap $O_{SS}$, $O_{DS}$ can vary starting at the center 54 of the main flow path in the direction of the two main flow limiting means 56, whereby it/they can have different configurations in the direction of the main flow limiting means on the hub side and in the direction of the main flow limiting means on the housing side.

This document discloses a turbomachine having at least one blade-row group that is arranged in a main flow path and at least two adjacent rows of blades that are adjacent to each other as seen in the main flow direction, each row having a plurality of blades 38, 40, whereby a narrow cross section and at least one degree of overlap between the blades of the upstream row of blades and the blades of the downstream row of blades vary starting at the center of the main flow path in the direction of at least one main flow limiting means.

LIST OF REFERENCE NUMERALS 2 hub
4 housing 6 rotor axis
8 main flow path
10 blade-row group on the rotor side
12 blade-row group on the stator side
14 variable blade-row group
16 blade
18 blade
20 clearance
22 rotary disk
24 rotary disk
26 transversal axis
28 trailing edge
30 leading edge
32 blade
34 center of the main flow path
36 flow channel
38 front blade
40 rear blade
42 trailing edge
44 leading edge
46 pressure side
48 suction side
50a, b plumb line
52a, b skeleton line
54 center of the main flow path
56 main flow limiting means
58 straight line
60 straight line
62 line
64 curve
66 straight line
68 straight line
70 curve
72 line
74 arc
$D_{min}$ narrow cross section
$O_{DS}$ degree of overlap on the pressure side
$O_{SS}$ degree of overlap on the suction side

What is claimed is:

1. A turbomachine comprising:
at least one blade-row group arranged in a main flow path including an upstream row of blades and a downstream row of further blades adjacent to each other in a main flow direction, a narrowest cross section and a degree of overlap between the blades of the upstream row and the further blades of the downstream row varying starting at a center of the main flow path in the direction of a main flow limiter; wherein the degree of overlap increases steadily in the direction of the main flow limiter.

2. The turbomachine as recited in claim 1 wherein the narrowest cross section increases steadily in the direction of the main flow limiter.

3. The turbomachine as recited in claim 1 wherein the narrowest cross section increases in the direction of the main flow limiter and then decreases.

4. The turbomachine as recited in claim 1 wherein the narrowest cross section increases in the direction of the main flow limiter and then remains constant.

5. The turbomachine as recited in claim 1 wherein the narrowest cross section decreases steadily in the direction of the main flow limiter.

6. The turbomachine as recited in claim 1 wherein the narrowest cross section decreases in the direction of the main flow limiter and then increases.

7. The turbomachine as recited in claim 1 wherein the narrowest cross section decreases in the direction of the main flow limiter and then remains constant.

8. A turbomachine comprising:
at least one blade-row group arranged in a main flow path including an upstream row of blades and a downstream row of further blades adjacent to each other in a main flow direction, a narrowest cross section and a degree of overlap between the blades of the upstream row and the further blades of the downstream row varying starting at a center of the main flow path in the direction of a main flow limiter; wherein the degree of overlap increases in the direction of the main flow limiter and then decreases.

9. A turbomachine comprising:
at least one blade-row group arranged in a main flow path including an upstream row of blades and a downstream row of further blades adjacent to each other in a main flow direction, a narrowest cross section and a degree of overlap between the blades of the upstream row and the further blades of the downstream row varying starting at a center of the main flow path in the direction of a main flow limiter; wherein the degree of overlap increases in the direction of the main flow limiter and then remains constant.

10. A turbomachine comprising:
at least one blade-row group arranged in a main flow path including an upstream row of blades and a downstream row of further blades adjacent to each other in a main flow direction, a narrowest cross section and a degree of overlap between the blades of the upstream row and the further blades of the downstream row varying starting at a center of the main flow path in the direction of a main flow limiter; wherein the narrowest cross section decreases in the direction of the main flow limiter and then remains constant.

* * * * *